Patented July 23, 1940

2,209,237

UNITED STATES PATENT OFFICE 2,209,237

MATCH

Joseph Simon, George Foster, and Adam J. Manxi, Chicago, Ill., assignors to Arrow Match Corporation, Chicago, Ill., a corporation of Illinois No Drawing. Application January 16, 1939, Serial No. 251,213

3 Claims. (Cl. 52—26)

The invention relates to improvements in matches and has for its primary object the provision of an improved match which will automatically extinguish itself and thereby minimize danger of fire therefrom.

Another object of the invention is the provision of a match of the character indicated which is especially adapted for use by smokers and will not cause a flame.

Other objects will appear hereinafter.

The invention consists in the combinations and arrangements of parts hereinafter described and claimed.

In making matches embodying the invention we first provide a suitable incombustible stick or support therefor. One way of providing this stick is to take the ordinary wooden match stick and coat one end thereof with an incombustible coating. This may be accomplished by mixing together powdered glass and gum tragacanth in proportions of ten parts by volume of the glass to one part of the gum. Enough water is added to render the mixture semi-liquid and about the consistency of a high grade paint. About one-half inch of the end of the match stick is then coated therewith by dipping the same in the mixture and allowing it to dry.

Another match stick for the purpose may be made by mixing together precipitated calcium carbonate, gum arabic and water until a mixture of substantially the consistency of bread dough is provided. This doughy mixture may then be extruded through a macaroni press or machine and permitted to dry, thereby forming incombustible rod like bodies which may be employed as the sticks for matches.

We then provide a saturated solution of potassium chlorate in water and filter the same to remove any residue of potassium chlorate thereby providing a clear saturated solution. A teaspoonful of gum tragacanth is then added to one-fourth of an ordinary drinking glass of water and the two solutions mixed together in the proportion of one part by volume of the gum solution to three parts by volume of the chlorate solution. Finely powdered carbon in the form of charcoal produced by smothering burning cotton is then mixed with red lead oxide in the proportion of nine parts by volume of the powdered carbon to one part by volume of the lead oxide. Enough of the mixture of the solutions of gum and potassium chlorate is then added to the mixture of carbon and oxide to form a paste and the coated ends of the match sticks are dipped in this paste and then permitted to dry. The incombustible ends of the match sticks are thus coated with a coating having a relatively low percentage of combustion promoting substance mixed with powdered carbon.

An ignition tip for the match heads thus formed is provided by mixing together equal quantities by volume of wetted powdered carbon or cotton charcoal and potassium chlorate with enough of a solution of gum tragacanth to form a thick paste. The coated or headed ends of the matches are then dipped twice in this mixture, once the entire length of the match head, and once about half the length thereof and the match thus produced permitted to dry and harden. After drying, the matches thus produced are ready for boxing and use in the usual way. When struck against the side of a match box provided with the usual phosphorus coating it will be found that these matches are ignited but will not burn in a flame, merely glowing or burning in the form of a spark large enough to furnish means for igniting a cigarette or cigar. Thus the matches produced as above described will serve the ordinary purpose of a smoker in igniting a cigarette, cigar or a pipe, but will not readily ignite other substances such as paper and therefore are not likely to start fires accidentally when used and discarded. As soon as the combustible material on the head of the match has been consumed it will automatically extinguish itself and of course will then constitute no further menace for accidentally starting fires. The incompletely charred cotton fibres resulting from smothering burning cotton retain sufficient stiffness so they will not pack into a compact mass but will form minute air-filled interstices between them, thereby permitting use of a minimum of combustible material and insuring that the match head will burn merely as a spark and not in a flame.

A match which will flame slightly when first struck and will then burn with a spark or a glow may be produced as follows. A saturated solution of melted beeswax in alcohol is first provided. Two parts by volume of the powdered carbon or cotton charcoal is then added to one part by volume of the beeswax solution and the two thoroughly mixed until a paste is formed. Sufficient solution of gum tragacanth is then added to the mixture as before to cause it to adhere to a match stick in the form of a coating. Then incombustible match sticks are then dipped in this mixture until their ends are thoroughly coated therewith and permitted to dry. An ignition tip is then provided for the match as before. It will be found that matches thus produced will burn with a slight flame when first struck but that practically as soon as the underlying coating has been ignited thereby, the flame will automatically go out and the head of the match then burn or glow merely as a spark sufficient for lighting cigarettes, cigars, pipes and the like and will automatically extinguish itself after a comparatively short period.

While we have illustrated and described the preferred forms and methods of procedure for carrying the invention into effect, these are capable of variation and modification without departing from the spirit of the invention. We therefore do not wish to be limited to the precise details disclosed, but desire to avail ourselves of such variations and modifications as fall within the scope of the appended claims.

We claim:

1. A match comprising an incombustible stick; a head at one end thereof consisting of a coating of incompletely charred cotton fibres mixed with a relatively low percentage of combustion-promoting substance; and an ignition tip for said head.

2. The match specified in claim 1 in which the combustion-promoting substance is potassium chlorate.

3. The match specified in claim 1 in which the combustion-promoting substance is potassium chlorate and beeswax.

JOSEPH SIMON.
GEORGE FOSTER.
ADAM J. MANXI.